(12) United States Patent
Engstrom

(10) Patent No.: US 10,258,049 B2
(45) Date of Patent: Apr. 16, 2019

(54) HOT AIR OVEN

(71) Applicant: REVENT INTERNATIONAL AB, Upplands Vasby (SE)

(72) Inventor: Olof Engstrom, Huddinge (SE)

(73) Assignee: Revent International AB, Upplands Vasby (SE)

( * ) Notice: Subject to any disclaimer, the term of this patent is extended or adjusted under 35 U.S.C. 154(b) by 600 days.

(21) Appl. No.: 14/427,137

(22) PCT Filed: Sep. 13, 2013

(86) PCT No.: PCT/SE2013/051069
§ 371 (c)(1),
(2) Date: Mar. 10, 2015

(87) PCT Pub. No.: WO2014/042585
PCT Pub. Date: Mar. 20, 2014

(65) Prior Publication Data
US 2015/0237872 A1    Aug. 27, 2015

(30) Foreign Application Priority Data
Sep. 14, 2012 (SE) ........................................ 1251030

(51) Int. Cl.
*A21B 1/26* (2006.01)
*F28D 1/03* (2006.01)
(Continued)

(52) U.S. Cl.
CPC .............. *A21B 1/26* (2013.01); *F28D 1/0308* (2013.01); *F28D 1/053* (2013.01); *F28F 1/40* (2013.01);
(Continued)

(58) Field of Classification Search
CPC ........... A21B 1/26; A21B 1/28; F28D 1/0308; F28D 1/053; F28D 21/0003;
(Continued)

(56) References Cited

U.S. PATENT DOCUMENTS 375,662 A * 12/1887 Walker .................... F24H 3/006
                                                                126/273 R
489,827 A *  1/1893 Newlin .......................... 122/87
(Continued)

FOREIGN PATENT DOCUMENTS

DE    102005020727 A1    11/2006
EP        0 359 358 A1     3/1990
(Continued)

OTHER PUBLICATIONS

International Search Report, dated Mar. 14, 2014, from corresponding PCT application.
(Continued)

*Primary Examiner* — Gregory L Huson
*Assistant Examiner* — Daniel E Namay
(74) *Attorney, Agent, or Firm* — Adsero IP

(57) ABSTRACT

In order to improve the transfer of heat from a warm fluid inside a heat exchanger tube (333) including an elongated tube with a wall with an exterior surface and an interior surface, the interior surface is provided with at least one longitudinally extending interior wall (363', 363") which extends from one side of the interior surface towards another side of the interior surface.

10 Claims, 4 Drawing Sheets

(51) Int. Cl.
*F28D 1/053* (2006.01)
*F28F 1/40* (2006.01)
*A21B 1/28* (2006.01)
*F24C 15/32* (2006.01)
*F28D 21/00* (2006.01)

(52) U.S. Cl.
CPC .. *F28D 21/0003* (2013.01); *F28D 2021/0056* (2013.01)

(58) Field of Classification Search
CPC .... F28D 2021/0056; F28D 21/00; F28D 1/03; F28D 1/40; F28F 1/40; F24C 15/322; F24C 15/32
USPC ............. 126/21 A, 29 D, 39 D, 100, 109, 6, 126/273 R; 165/50, 163, 179
See application file for complete search history.

(56) References Cited

U.S. PATENT DOCUMENTS

| | | | | |
|---|---|---|---|---|
| 2,099,883 | A * | 11/1937 | Graham | F24C 11/00 126/39 A |
| 2,431,753 | A | 12/1947 | Holderle et al. | |
| 2,578,520 | A | 12/1951 | Roger | |
| 4,351,392 | A * | 9/1982 | Stockman | F28F 1/40 110/326 |
| 4,552,123 | A | 11/1985 | Birkner et al. | |
| 4,766,953 | A | 8/1988 | Grieb et al. | |
| 4,815,535 | A * | 3/1989 | Hagemeister | F28D 7/06 165/163 |
| 5,058,266 | A * | 10/1991 | Knoll | B23K 1/0012 165/179 |
| 5,185,925 | A | 2/1993 | Ryan et al. | |
| 5,476,141 | A * | 12/1995 | Tanaka | F28D 1/05391 165/173 |
| 5,704,423 | A * | 1/1998 | Letrange | B21C 37/151 138/117 |
| 6,000,467 | A * | 12/1999 | Tokizaki | F28D 1/05391 165/110 |
| 6,044,833 | A | 4/2000 | Gebhardt et al. | |
| 6,988,539 | B2 * | 1/2006 | Kato | B23K 1/0012 165/133 |
| 7,165,606 | B2 * | 1/2007 | Take | F25B 39/00 165/175 |
| 8,440,948 | B2 * | 5/2013 | Noda | F24C 15/16 126/21 A |
| 2002/0007941 | A1 * | 1/2002 | Zhu | C10G 9/20 165/177 |
| 2002/0066554 | A1 * | 6/2002 | Oh | F28D 1/0535 165/179 |
| 2003/0209344 | A1 | 11/2003 | Fang et al. | |
| 2009/0311399 | A1 * | 12/2009 | Koos | A21B 1/44 426/523 |
| 2011/0094258 | A1 * | 4/2011 | Lee | F28D 1/0478 62/498 |
| 2015/0068244 | A1 * | 3/2015 | Lee | F28F 17/005 62/498 |

FOREIGN PATENT DOCUMENTS

| | | | | |
|---|---|---|---|---|
| EP | 0 941 661 | A2 | 9/1999 | |
| EP | 2 384 626 | A1 | 11/2011 | |
| GB | 2 424 265 | A | 9/2006 | |
| JP | 6091970 | U | 6/1985 | |
| JP | 62233690 | A | 10/1987 | |
| JP | 02084254 | A * | 3/1990 | ............. F28F 1/022 |
| JP | 06300473 | A * | 10/1994 | ......... F28D 1/05391 |
| JP | 08261679 | A | 10/1996 | |
| JP | 11289961 | A | 10/1999 | |
| JP | 2002181468 | A * | 6/2002 | ............. F28D 7/16 |
| JP | 2004 309075 | A | 11/2004 | |
| JP | 2005351567 | A * | 12/2005 | ........... F28D 7/1684 |

OTHER PUBLICATIONS

May 9, 2017, JP communication issued for related JP application No. 2015-531890.

* cited by examiner

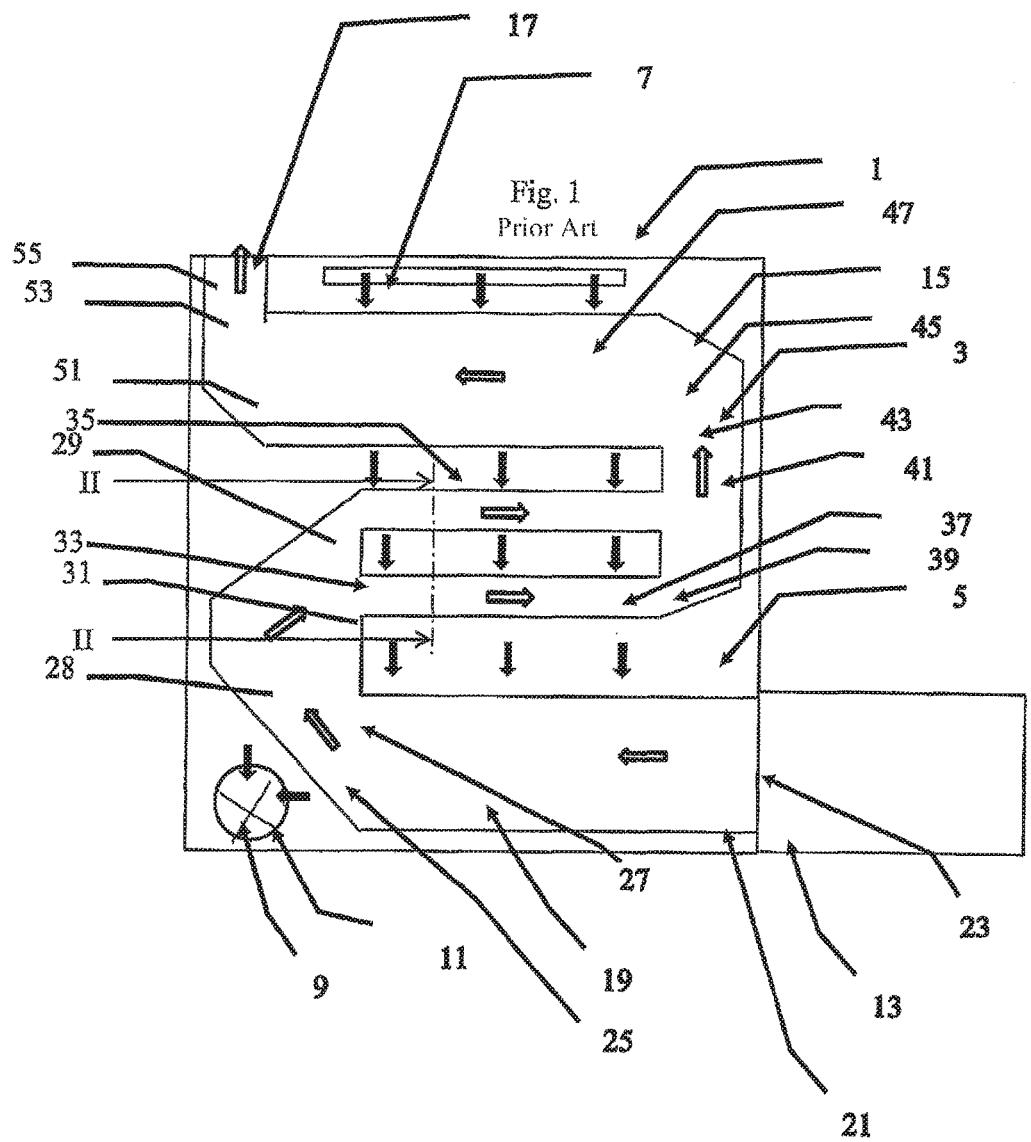
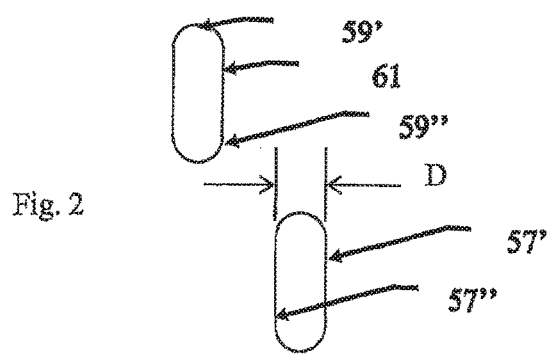

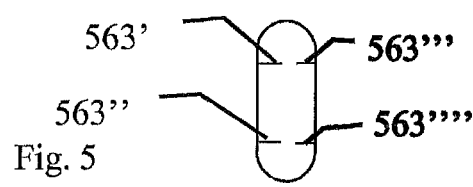
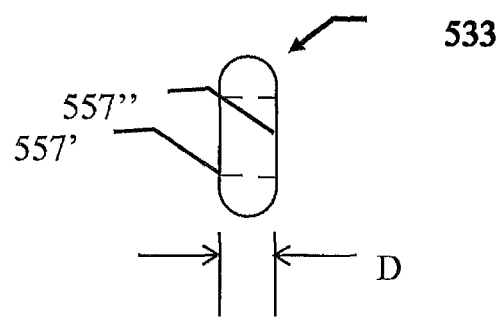
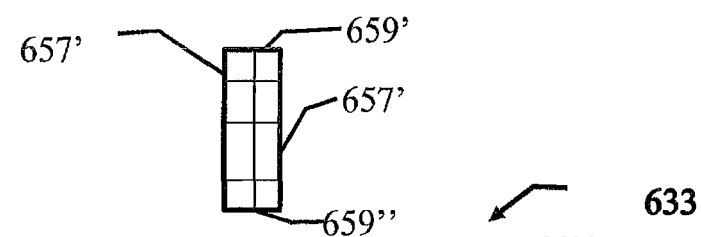
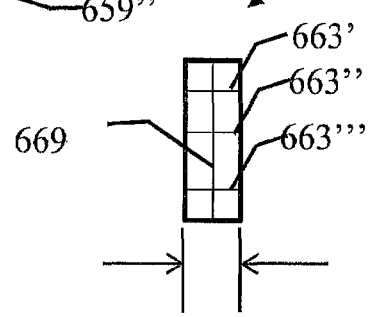
Fig. 5
Fig. 6

HOT AIR OVEN

FIELD OF THE INVENTION

The present invention relates to a hot air oven comprising a plurality of heat exchanger tubes, and methods for using such heat exchanger tubes.

BACKGROUND OF THE INVENTION

Hot air for cooking food in baker's ovens can be produced by burning a fuel in a burner and transferring the heat in the exhaust gases via a cross-flow tube heat exchanger to cooking air without the cooking air being contaminated by the exhaust gases. The heated cooking air is transported into the cooking chamber of the oven. Conventional baker's ovens use S-shaped ducts arranged inside a heating chamber to transport the hot exhaust air from the burner to a chimney, with the substantially horizontal bottom section of the S connected to the outlet of the burner, the substantially horizontal intermediate section of the S containing heat exchanger pipes to heat up the cooking air and the substantially horizontal upper section being connected to a chimney. The heat exchanger pipes are normally in the shape of tubes with circular transverse cross-section or rectangular with rounded short sides and are made of a material with a high coefficient of heat transfer. The exhaust gases pass though the inside (known as the "hot side") of the heat exchanger heat transfer tubes and the cooking air is forced to flow around the outside of the tubes (known as the "cold side" of the heat exchanger) in a direction which is substantially perpendicular to the flow inside the tubes. Normally the cooking air enters the heating chamber at the bottom of the chamber where the exhaust gas is at its lowest temperature and circulates up past the heat exchanger tubes and burner exhaust tube where the temperature is highest before being transported into the cooking chamber of an oven. This flow of air is driven by a fan. The amount of heat transferred from the exhaust gases to the cooking air is influenced by the surface area of the heat exchanger surfaces in contact with the exhaust gases and cooking air, the heat transfer coefficient of the heat exchanger (which is influenced, amongst others, by the materials used and their surface properties, and the air flow in and around the heat exchanger) and the temperature difference across the walls of the heat exchanger. While conventional heat exchangers are relatively compact and have good efficiency they still take up a lot of space and are a major contributor to the foot print of a baker's oven. It would be desirable to improve the efficiency of the conventional heat exchangers. This would lead to the advantages of being able to produce baker's ovens with a smaller footprint and/or lower running costs as increased efficiency would lead to less fuel being required to heat the same amount of cooking air. Conventional methods for increasing the heat flow from the exhaust gases to the cooking air in the heat exchanger include changing the shapes of the heat exchanger tubes to increase the surface area exposed to the cooking air or to add more tubes. Such measures may increase the efficiency slightly but at the cost of increased air friction on the cold side which requires the use of a larger fan and increased running costs.

GB-2424265 relates to heat exchange tubes with integral fins. In the background it is mentioned that it is common knowledge to provide a vessel through which the heated fluid is flowing with as large a surface area as possible in order to maximise the transfer of heat. The interior of the tubular body is typically divided into a plurality of longitudinal passages, the dividing walls between the passages serving both to strengthen the tubular body and to increase the surface area over which transmission of heat to or from the fluid flowing through the passages may take place.

US-2003/209344 relates to a heat exchanger comprising tubes, where each of the tubes includes a passageway, which is divided into a plurality of sub-passageways. Each of the sub-passageways is generally rectangular in shape (other geometrical shapes are mentioned) and has a finned interior wall surface.

DE-102005020727 and EP-0359358D3 also relate to heat exchangers provided with tubes having two or several channels.

However, none of the background prior art documents includes any heat exchanger tubes specifically adapted for use in hot air ovens.

BRIEF DESCRIPTION OF THE INVENTION

The present invention solves the problem of how to improve the efficiency of a tube heat exchanger in a hot air oven without increasing the air friction on the exterior side of the heat exchanger tubes by means of a heat exchanger tube having the features of claim 1.

Thus, the present invention relates to a hot air oven provided with a cross-flow tube heat exchanger comprising at least two rows of a plurality of heat exchanger tubes. The heat exchanger tubes in each row are arranged in an essentially horizontal plane, and that heat exchanger tubes in one row are in a predetermined relationship in relation to the heat exchanger tubes in an adjacent row. Each heat exchanger tube comprising an elongated tube with a tube wall, and that the interior of the elongated tube is provided with at least one longitudinally extending interior wall which extends from one side of the interior surface of the elongated tube towards another side of the interior surface.

Preferably, the predetermined relationship involves that the tubes in adjacent rows are vertically aligned or that the tubes in adjacent are vertically offset.

Advantageously, the rows of heat exchanger tubes are arranged in an intermediate section of cross-flow tube heat exchanger.

Preferred embodiments are set forth in the dependent claims.

The hot air oven according to the present invention has proven to improve the efficiency in relation to when conventional heat exchangers are used. It is then possible to produce baker's ovens with a smaller footprint and/or lower running costs as increased efficiency has led to less fuel being required to heat the same amount of cooking air.

Bakers oven have the special requirements where the outer side (where the baking air flows) is of a turbulent kind, with high thermal transfer capabilities. Whereas the inner side has a significant lower air mass flow (approx. one tenth) the large inner surface improves efficiency by raising heat flux. Hence making the surface larger on the outside doesn't improve efficiency; rather it increases foot print and costs.

As temperature difference between exhaust gas and baking air ($\Delta T$) decreases more surface is needed. When $\Delta T$ is high, low surface area is needed; the higher temperature raises the heat flux on the heating element. However, higher $\Delta T$ will increase temperature on the surface, which will force the use of more exclusive materials, such as heat resistant steel. The present invention makes it possible to optimize the inner surface area so that the temperature on the other surface matches the optimal range for the materials used.

In one embodiment of the invention the inner surface area of the heat exchanger tubes is reduced in special locations. For example, close to the burner to decrease heat flux and the outer surface temperature. This feature improves the control of the temperature and to adjust the temperature to an optimal range.

BRIEF DESCRIPTION OF THE DRAWINGS

FIG. 1 shows schematically a simplified side view of a conventional cross-flow tube heat exchanger for a baker's oven.

FIG. 2 shows schematically a cross-section of the heat exchanger tubes along line II-II of FIG. 1.

FIG. 5 shows schematically a cross-section corresponding to that of FIG. 4 for a second embodiment of heat exchanger tubes in accordance with the present invention.

FIG. 6 shows a schematically cross-section corresponding to that of FIG. 4 for a third embodiment of heat exchanger tubes in accordance with the present invention.

DETAILED DESCRIPTION OF THE INVENTION

Figure 3:
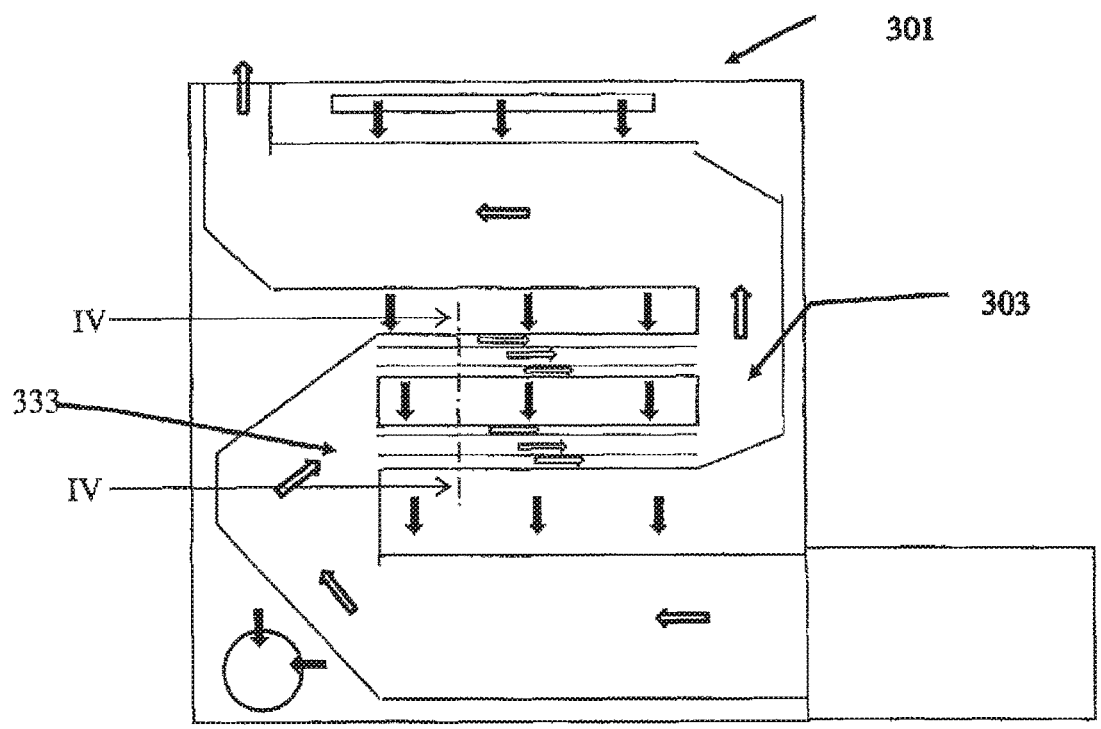
FIG. 3 shows schematically a simplified side view of a cross-flow tube heat exchanger for a baker's oven provided with heat exchanger tubes in accordance with a first embodiment of the present invention.

FIG. 1 shows schematically a simplified side view of a baker's oven 1 with a conventional cross-flow tube heat exchanger 3. The heat exchanger is inside a heating chamber 5 in which cooking air which is to be heated flows from an upper inlet vent 7 past the hot heat exchanger to an outlet 9 near the base of the unit. The rate of flow of air is controllable by a fan 11. Hot exhaust gases for warming the cooking air are generated by a burner 13 which burns fuel such as gas or oil. The exhaust gases pass through a gas-tight duct system 15 which leads from the burner to a chimney 17. Duct-system 15 is S-shaped with three horizontal sections and three vertical sections. The substantially horizontal bottom section 19 of the S is connected at its inlet end 21 to the outlet 23 of the burner and is connected at its outlet end 25 to the inlet 27 of the lower vertical section 28. The outlet end 29 of the lower vertical section is connected to the inlet ends 31 of a plurality of heat exchanger tubes 33 which form the substantially horizontal intermediate section 35 of the S. These heat exchanger pipes transfer heat energy from the exhaust gases inside them to the cooking air flowing past them. The outlet ends 37 of the heat transferring tubes are connected to the inlet end 39 of the intermediate vertical section 41. The outlet end 43 of the intermediate vertical section is connected to the inlet end 45 of the upper horizontal section 47. The outlet end 51 of the upper horizontal section is connected to the lower inlet end 53 of chimney 55 which has an open upper end through which the cooled exhaust gases escape.

As can be seen in FIG. 2, each heat exchanger tube 33 has a cross-section in the shape of a rectangle with rounded ends, i.e. the cross-section has two straight and parallel long sides 57' and 57", separated by a distance D, and connected by a pair of convex curved ends 59' and 59" of diameter of curvature D. The thin tube wall 61 of each heat exchanger tube is made of a material with good thermal conductivity and corrosion resistance, for example a metal such as pure or alloyed aluminium, copper or iron.

FIG. 3 shows schematically a simplified side view of a baker's oven 301 of the type shown in FIG. 1 but provided with a cross-flow tube heat exchanger 303 with heat exchanger tubes 333 in accordance with a first embodiment of the present invention.

Figure 4:
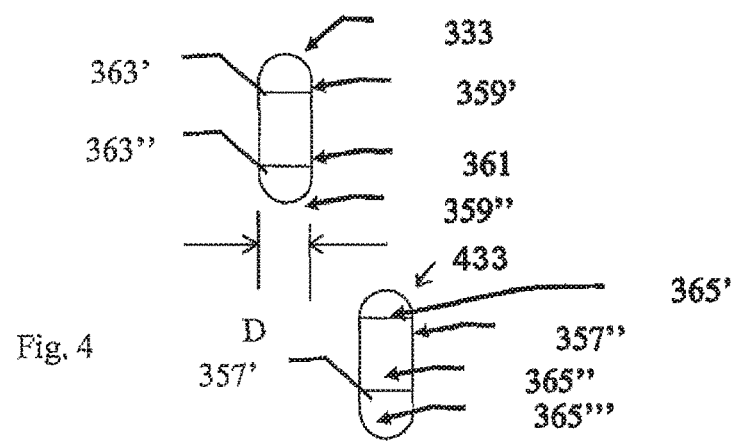
FIG. 4 shows schematically a cross-section of the heat exchanger tubes along line IV-IV of FIG. 1.

As can be seen in FIG. 4, the heat exchanger tubes 433 have the same external shape as the conventional tubes, i.e. a cross-section with two straight and parallel long sides 357' and 357", separated by a distance D, and connected by a pair of short ends 359' and 359". In this embodiment of the invention the short ends are convex and have a diameter of curvature D. The thin tube wall 361 of each heat exchanger tube 333 is made of a material with good thermal conductivity and corrosion resistance, for example a metal such as pure or alloyed aluminium, copper or iron.

The interior of these heat exchanger tubes are provided with one or more—in this example two—longitudinally extending interior walls 363', 363". Each interior wall stretches from one long side 357' to the opposite long side 357" of the heat exchanger wall 361, thus dividing the heat exchanger tube into three elongated compartments 365', 365", 365''' through which the exhaust gases flow. Preferably the compartments are closed, i.e. there is no transverse exhaust gas flow between compartments which maximises the surface area of their walls exposed to exhaust gas. However, as an alternative, one or more of the interior walls may be perforated to induce turbulence in the flow. The interior walls are made of a material with good thermal conductivity and corrosion resistance, for example a metal such as pure or alloyed aluminium, copper or iron and preferably they are made of the same material as the thin walls 361 of the heat exchanger tubes. The joints between the interior walls and the interior surface of the heat exchanger tube walls preferably are arranged to provide a good transfer of heat from the interior walls to the heat exchanger tubes wall. Preferably the interior walls are formed integrally with the exterior walls, for example by extruding, or are joined together by welding or riveting with heat transfer paste between the components. During use the interior walls are heated by the exhaust gas flowing in the elongated compartments and the interior walls transfer this heat by conduction to the heat exchange tube wall. Thus the interior walls are in contact with the exhaust gas in centre of the interior of the heat exchanger tubes. In conventional heat exchanger tubes the exhaust gas in centre of the interior of the heat exchanger tube is not in contact with the walls of the heat exchanger tubes and it only loses heat comparatively slowly. In the present invention the interior walls extract heat energy from the exhaust gas and transfers it to the exterior walls which allows heat to be extracted more quickly from the exhaust gas than a conventional tube heat exchanger does. This allows a tube heat exchanger in accordance with the present invention to perform as well as a larger conventional tube heat exchanger.

FIG. 5 shows a cross-section through a second embodiment of a pair of heat exchanger tubes 533 in accordance with the present invention. In this embodiment, the interior of these heat exchanger tubes are provided with one or more—in this example four—interior longitudinally extending walls 563', 563", 563''', 563''''. Each interior wall stretches from one long side 557' towards the opposite long side 557" but does not contact it. This divides the heat exchanger tube into three open (i.e. there is nothing which prevents exhaust gas from flowing from one compartment into another compartment) elongated compartments 565', 565", 565''' though which the exhaust gases flow. The innermost ends and/or the exposed surfaces of the interior walls may be roughened or shaped to induce turbulence in order to aid the transfer of heat energy from the exhaust gas to the interior wall.

FIG. 6 shows a cross-section through a second embodiment of a heat exchanger tube 633 in accordance with the present invention. In this embodiment, the short sides 659', 659" of the heat exchanger tubes are straight and the heat exchanger tube has a quadratic cross-section. The interior of these heat exchanger tubes are provided with one or more—in this example three—longitudinally extending interior walls 663', 663", 663'''. Each interior wall extends from one long side 657' to the opposite long side 657". Each interior wall is connected to its neighbouring wall or walls by a central wall 669 which is arranged parallel to the long sides of the heat exchanger tube. Preferably each central wall 669 is arranged on the line of symmetry of the heat exchanger tube to ensure that the exhaust gas which is furthest away from the exterior wall has heat energy extracted from it. These interior walls divide the heat exchanger tube into eight closed elongated compartments though which the exhaust gases flow.

Figure 7:
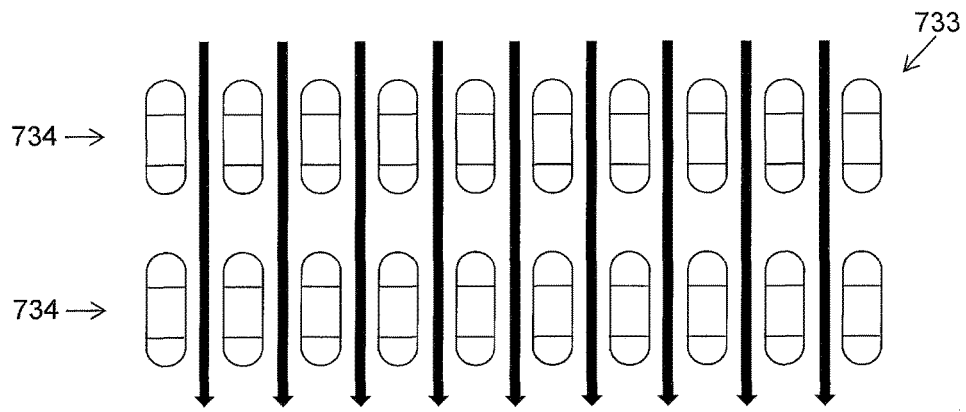
FIGS. 7 and 8 show schematically cross-sections of two rows of heat exchanger tubes, according to the present invention.

FIG. 7 shows a cross section along IV-IV in FIG. 3 of the horizontal intermediate section of the S-shaped duct-system where the exhaust gas should pass. In this embodiment the intermediate section comprises two essentially horizontally arranged rows 734 of a plurality of heat exchanger tubes 733. The rows of heat exchanger tubes do not necessarily be arranged at an intermediate section but also in an upper or lower section of a cross-flow heat exchanger. In this illustrated embodiment ten tubes are provided in each row, but naturally fewer or more tubes may be arranged. Each of these tubes may be of any of the heat exchanger tubes described in the present application. In the illustrated embodiment each tube is provided with longitudinally extending walls defining three separate channels within each tube. In the figure the cooking air is illustrated by vertical arrows.

Figure 8:
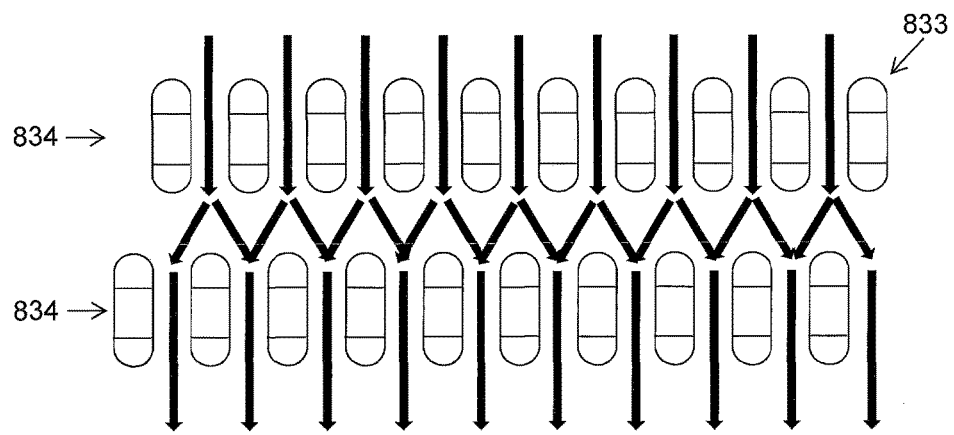

FIG. 8 shows a similar embodiment as in FIG. 7. In this embodiment the two rows 834 of heat exchanger tubes 833 are offset in relation to each other. This is advantageous in that cooking air is more subjected to the heat in the exhaust flow in the lower row of the exchanger tubes.

Figure 9:
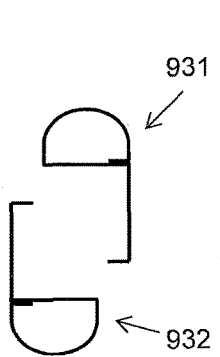
FIGS. 9-11 show different views of an embodiment of the heat exchanger tube.
Figure 10:
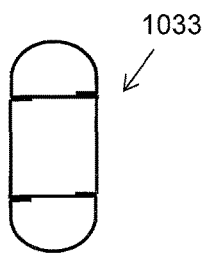

FIGS. 9 and 10 are simplified illustrations of cross sections of a preferred heat exchanger tube made up from two identical folded metal plate parts.

FIG. 9 shows the two parts 931, 932 before they are combined, preferably by welding or fusing, and FIG. 10 shows the cross section of the combined heat exchanger tube 1033.

Figure 11:
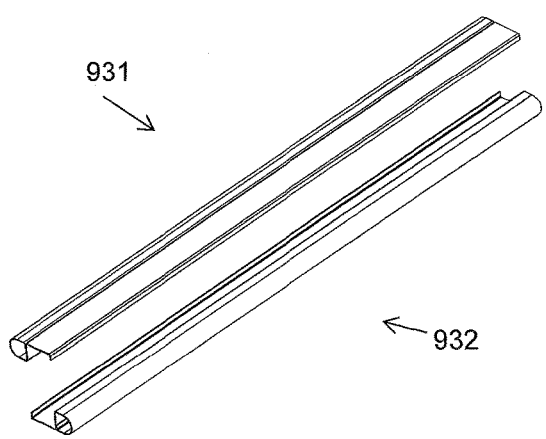

In FIG. 11 a perspective view is shown illustrating the two folded metal sheet parts 931, 932 before they are combined into a heat exchanger tube.

The heat exchanger tube manufactured as illustrated in FIGS. 9-11 has proven to fulfil the high requirements of low production costs and excellent heat transfer capabilities.

In all embodiments of the present invention the innermost ends and/or the exposed surfaces of the longitudinally extending interior walls may be roughened, perforated or shaped to induce turbulence in order to aid the transfer of heat energy from the exhaust gas to the interior wall. Preferably, the interior walls are made of a material with good thermal conductivity and corrosion resistance, for example a metal such as pure or alloyed aluminium, copper or iron and preferably they are made of the same material as the thin walls of the heat exchanger tubes. The joints between the interior walls and the interior surface of the heat exchanger tube walls preferably are arranged to provide a good transfer of heat from the interior walls to the heat exchanger tubes wall. Preferably the interior walls are formed integrally with the exterior walls, for example by extruding, or are joined together by welding or riveting. In the event that the heat exchanger tubes are fabricated by assembling a plurality of components it is preferable to use heat transfer paste between the components to ensure high thermal conductivity between the components.

In accordance with the present invention the longitudinally extending interior walls may be straight and aligned with the longitudinal axis of the heat exchanger tube or they may be curved like the flutes of a spiral.

In one embodiment of the invention the inner surface area of the heat exchanger tubes is reduced in special locations, i.e. along the longitudinal direction of the heat exchanger tubes. This may be achieved by e.g. increasing the height of the longitudinal interior walls 563', 563", 563''', 563'''' in the longitudinal direction of the tubes. In one advantageous example, the inner surface area of the heat exchanger tubes is smaller close to the burner and then increases in the air flow direction. Thereby the heat flux is decreased and also the outer surface temperature of the heat exchanger tubes. This feature improves the control of the temperature and the possibility to adjust the temperature to an optimal range.

Heat exchanger tubes in accordance with the present invention can be used in methods for exchanging heat energy from a first fluid to a second fluid in which the first fluid is at a higher temperature than the second fluid and the first fluid flows along the inside of a heat exchanger tube in accordance with the present invention and the cooler second fluid flows outside said heat exchanger tube, or vice versa. Preferably the fluid outside the heat exchanger tube flows across the heat exchanger tube substantially perpendicularly as illustrated in the above description and in the figures, or it flows in the reverse direction or it flows in at an angle other than 90° to the direction of flow of the fluid inside the heat exchanger tubes.

While the invention has been illustrated with heat exchanger tubes of approximately quadratic cross sections with straight or rounded short ends, it is possible to adapt the use of the interior walls of the invention with tubes of any practical cross-sectional shape.

The invention is not limited to the examples given above but may be modified within the scope of the appended claims.

The invention claimed is:

1. Hot air oven provided with a cross-flow tube heat exchanger comprising at least two rows of a plurality of heat exchanger tubes, the heat exchanger is arranged inside a heating chamber in which cooking air which is to be heated flows past the hot heat exchanger, hot exhaust gases for warming the cooking air are generated by a burner, the exhaust gases pass through a gas-tight duct system, including said heat exchanger tubes, which leads from the burner to a chimney, and that the heat exchanger tubes in each row are arranged in an essentially horizontal plane, and that heat exchanger tubes in a first row are in a predetermined relationship in relation to the heat exchanger tubes in a second vertically adjacent row, wherein said predetermined relationship involves that the heat exchanger tubes in the first row are horizontally and vertically offset from the heat exchanger tubes in the second vertically adjacent row, each heat exchanger tube comprising an elongated tube with a tube wall, the interior of the elongated tube is provided with at least one longitudinally extending interior wall which extends from one side of the interior surface of the elongated tube towards another side of the interior surface, wherein, during use, the interior walls are heated by the exhaust gas and the interior walls transfer this heat by conduction to the heat exchange tube wall, wherein each tube has a cross-section with two straight and parallel long sides, separated by a distance D, and connected by a pair of convex curved ends of diameter of curvature D, and wherein the at least one interior wall extends from one long side to the other long side.

2. Hot air oven according to claim 1, wherein said rows of heat exchanger tubes are arranged in an intermediate section of cross-flow tube heat exchanger.

3. Hot air oven according to claim 1, wherein said at least one interior wall extends from one side of the interior surface and is in contact with another side of the interior surface.

4. Hot air oven according to claim 3, wherein each of said at least one interior wall is solid and that the tube is divided into longitudinally extending compartments, wherein said at least one interior wall prevents transverse flow between said compartments.

5. Hot air oven according to claim 1, wherein said tube is made up of two identical metal sheet parts, each being folded from one elongated planar metal sheet and then combined to form the tube.

6. Method for exchanging heat energy from a first fluid to a second fluid characterised by flowing the first fluid inside a heat exchanger tube in a hot air oven in accordance with claim 1 and flowing the second fluid outside said heat exchanger tube.

7. Method in accordance with claim 6, wherein the second fluid flows in a direction which is across the direction of flow of the first fluid.

8. Method in accordance with claim 6, in which the second fluid flows in the reverse direction to the direction of flow of the first fluid.

9. Hot air oven according to claim 1, wherein said rows of heat exchanger tubes are arranged in an intermediate section of cross-flow tube heat exchanger.

10. Hot air oven according to claim 1, wherein said at least one interior wall extends from one side of the interior surface and is in contact with another side of the interior surface.

\* \* \* \* \*